(12) United States Patent
Nagarajan

(10) Patent No.: US 9,975,244 B1
(45) Date of Patent: May 22, 2018

(54) REAL-TIME GENERATION OF TRAJECTORIES FOR ACTUATORS OF A ROBOT

(71) Applicant: X Development LLC, Mountain View, CA (US)

(72) Inventor: Umashankar Nagarajan, Santa Clara, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 82 days.

(21) Appl. No.: 15/226,710

(22) Filed: Aug. 2, 2016

(51) Int. Cl.
*G05B 19/18* (2006.01)
*B25J 9/16* (2006.01)

(52) U.S. Cl.
CPC ............ *B25J 9/1664* (2013.01); *Y10S 901/09* (2013.01)

(58) Field of Classification Search
CPC .............................. B25J 9/1664; Y10S 901/09
See application file for complete search history.

(56) References Cited

U.S. PATENT DOCUMENTS

| | | | |
|---|---|---|---|
| 8,078,320 B2 | 12/2011 | Joly et al. | |
| 2007/0013506 A1* | 1/2007 | Takenaka | B25J 13/085 340/500 |
| 2008/0147238 A1* | 6/2008 | Joly | G05B 19/237 700/260 |
| 2016/0139577 A1* | 5/2016 | Seehof | B25J 9/0009 700/275 |
| 2016/0336878 A1* | 11/2016 | Torres | H02N 2/02 |
| 2017/0108848 A1* | 4/2017 | Moberg | G05B 19/404 |

OTHER PUBLICATIONS

Kunz, Tobias, and Mike Stilman. "Time-optimal trajectory generation for path following with bounded acceleration and velocity." Robotics: Science and Systems VIII (2012). 8 pages.
Zlajpah, L. On time optimal path control of manipulators with bounded joint velocities and torques. InRobotics and Automation, 1996. Proceedings., 1996 IEEE International Conference on Apr. 22, 1996 (vol. 2, pp. 1572-1577). IEEE.
Van Dijk, N. J. M. et al. "Path-constrained motion planning for robotics based on kinematic constraints." ASME 2007 International Design Engineering Technical Conferences and Computers and Information in Engineering Conference. American Society of Mechanical Engineers, 2007. 10 pages.

* cited by examiner

*Primary Examiner* — Ian Jen
(74) *Attorney, Agent, or Firm* — Middleton Reutlinger (57) ABSTRACT

Methods, apparatus, systems, and computer readable media are provided for generating updated robot actuator trajectories in response to violation of torque constraints and/or other constraints in previously generated robot actuator trajectories. A real-time trajectory generator is used to generate trajectories for actuators of a robot based on a current motion state of the actuators, a target motion state of the actuators, and kinematic motion constraints of the actuators. The generated trajectory of each of the actuators is analyzed to determine whether a violation of at least one additional constraint occurs. In response to determining violation(s) of the additional constraint, one or more new kinematic motion constraints of the actuators are determined based on the violation(s). The real-time trajectory generator generates updated trajectories based on applying the new kinematic motion constraints in lieu of their counterparts used in generating the trajectories that included the violation(s) of the additional constraint.

19 Claims, 5 Drawing Sheets

REAL-TIME GENERATION OF TRAJECTORIES FOR ACTUATORS OF A ROBOT

BACKGROUND

Robots may perform a variety of tasks during which end effectors or other components of the robots must move to perform the tasks. For example, to retrieve an object and place the object in a container, an end effector of a robot must move from a current location to a pick up location for the object, then after picking up the object must move again to reach a location for placing the object in the container. A trajectory of the end effector during the movement defines the progression over time of motion states (e.g., position, velocity, acceleration, and/or jerk) of the end effector. Moreover, the trajectory of the end effector during the movement is dictated by the trajectories of actuators of the robot that control the movement of the end effector. Accordingly, the trajectory of the end effector during a movement is dictated by the progression over time of position, velocity, acceleration, and jerk of each of the actuators that control the movement of the end effector.

Various techniques may be employed for determining one or more trajectories to be followed by a robot in performance of a task. For example, some robots may employ real-time trajectory generation techniques that enable trajectories for actuators to be generated in real-time (e.g., within a control cycle of a robot), while taking into consideration kinematic motion constraints of the robots.

While some real-time trajectory generation techniques enable trajectories to be generated that satisfy certain kinematic constraints of a robot, they may not actively take into account one or more additional constraints, such as torque constraints. For instance, some real-time trajectory generators may seek to generate trajectories that operate in view of one or more defined "maximum"/"minimum" kinematic constraints (e.g., velocity, acceleration, and/or jerk) to achieve a "time optimal" trajectory. Since the real-time trajectory generators may not actively take torque constraints into account, the maximum/minimum kinematic constraints of such real-time trajectory generators are often set and maintained at conservative magnitudes to lessen the chance that generated trajectories will violate torque constraints.

Accordingly, while generated trajectories may be time optimal according to the defined kinematic constraints, in reality many generated trajectories may have more time optimal counterparts that could be achieved if less conservative maximum/minimum kinematic constraints were utilized. Additionally, there may be some configurations of a robot where the defined kinematic constraints may not be valid, and the robot may not be able to achieve a generated trajectory due to the dynamics of the robot in that configuration making it infeasible to track the planned motion. Additional and/or alternative drawbacks of these and/or other techniques may be presented.

SUMMARY

The present disclosure is generally directed to methods and apparatus for generating updated robot actuator trajectories in response to violation of torque constraints and/or other constraints in previously generated robot actuator trajectories.

In some implementations, a real-time trajectory generator is used to generate trajectories for actuators of a robot based on a current motion state of the actuators, a target motion state of the actuators (e.g., as supplied by a separate path planner), and kinematic motion constraints of the actuators (e.g., velocity constraint(s), acceleration constraint(s), and/or jerk constraint(s)). The generated trajectory of each of the actuators is analyzed to determine whether a violation of at least one additional constraint (e.g., a torque constraint) occurs in the trajectory. In response to determining one or more violations of the additional constraint, one or more new kinematic motion constraints (e.g., new acceleration constraints) of the actuators are determined based on the violation(s). The real-time trajectory generator may then generate updated trajectories for the actuators based on applying the new kinematic motion constraints in lieu of their counterparts used in generating the trajectories that included the violation(s) of the additional constraint.

The generated updated trajectories may then be used in lieu of one or more time steps of the prior trajectories. For example, multiple time steps of the prior trajectories may have already been implemented by the actuators and the updated trajectories may "take over" before full implementation of the prior trajectories—and prior to implementation of any of the time steps of the prior trajectories where violation(s) occur. The starting time for taking over the prior trajectories with the updated trajectories may be determined based on the determined violation(s) and the updated trajectory may be determined based on an anticipated current motion state of the actuators at the starting time (e.g., their anticipated motion states at the starting time as indicated by the prior trajectories). As another example of using the updated trajectories in lieu of the prior trajectories, the prior trajectories may have not yet been implemented and the updated trajectories used without any use of the prior trajectories.

The updated trajectory of each of the actuators may then be analyzed to determine whether a violation of the additional constraint occurs, one or more further new kinematic motion constraints determined if violation(s) occur, and further updated trajectories optionally generated based on the further new kinematic motion constraints (if the violation(s) occur). Additional iterations may occur until, for example, feasible trajectories over multiple time steps is achieved, the target waypoint are reached, and/or other criteria is satisfied.

Various technical effects may be achieved according to implementations disclosed herein. For example, some implementations may lessen the chance of, or prevent, full implementation of trajectories where torque constraints and/or other constraints of one or more actuators are violated. This may lessen the risk of damage to various robotic components, may lessen the occurrence of error conditions that may cause a robot to stop traversal toward a target waypoint, etc. Also, for example, some implementations may enable more aggressive kinematic motion constraints to be utilized in various iterations of generating trajectories of actuators for a target waypoint using a real-time trajectory generator. The more aggressive kinematic motion constraints may be utilized as various techniques disclosed herein can preemptively recognize violation of torque constraints and/or other constraints in trajectories and generate updated trajectories that "take over" those trajectories before they violate the torque constraints and/or other constraints. This may result in trajectories being achieved that are more time-optimal than trajectories generated by a real-time trajectory generator based on one or more static and conservative kinematic motion constraints (e.g., acceleration constraints). Moreover, various implementations generate updated trajectories based on one or more new kinematic motion constraints (e.g., acceleration constraints) that are reduced relative to those used in generating one or more prior trajectories, but may still be more aggressive than conservative acceleration constraints utilized in some prior techniques. This also may result in trajectories being achieved that are more time-optimal than trajectories generated by a real-time trajectory generator based on one or more static and conservative kinematic motion constraints.

Regardless of the particular technique(s) utilized to generate the trajectories, the trajectories may be provided for operating the actuators of the robot for one or more time steps. For example, the trajectories may be provided to one or more low level controllers for generating control commands based on the trajectories and providing those control commands to drivers associated with corresponding actuators.

In some implementations, a method implemented by one or more processors may be provided that includes identifying a target motion state of a plurality of actuators of a robot and generating, for each of the actuators by a real-time trajectory generator, a trajectory that defines motion states for the actuator. The trajectories transfer a current motion state of the actuators to the target motion state of the actuators. Generating the trajectories is based on applying, as input to the real-time trajectory generator: the current motion state of the actuators, the target motion state, and kinematic motion constraints of the actuators. The kinematic motion constraints include initial acceleration constraints of the actuators. The method further includes, for each of the actuators after generating the trajectories: determining whether a violation of an additional constraint of the actuator occurs in at least part of the trajectory of the actuator. The additional constraint is in addition to the kinematic motion constraints included in the input used to generate the trajectories. The method further includes: in response to determining that at least one of the trajectories has an occurrence of the violation, determining new acceleration constraints for the actuators; and generating, for each of the actuators by the real-time trajectory generator, an updated trajectory. Generating the updated trajectory includes applying the new acceleration constraints to the real-time generator in lieu of the initial acceleration constraints. The method further includes providing the updated trajectories for operating the actuators of the robot in lieu of the trajectories. The operating of the updated trajectories in lieu of the trajectories occurs prior to a full implementation of the trajectories by the actuators.

This method and other implementations of technology disclosed herein may each optionally include one or more of the following features.

In some implementations, each of the trajectories are defined by an acceleration profile having a plurality of segments and determining whether a violation of the additional constraint of the actuator occurs in at least part of the trajectory of the actuator includes: identifying an end of each of the segments of the acceleration profile; and determining whether the violation occurs at each of the ends of the segments based on a motion state of the actuator at each of the ends of the segments.

In some implementations, determining the new acceleration constraints for the actuators includes: determining a time interval of the violation in each of the trajectories with the violation and determining the new acceleration constraints based on one or more of the time intervals. In some of those implementations, determining the new acceleration constraints based on one or more of the time intervals includes: for each of the actuators, determining the new acceleration constraint for the actuator based on the additional constraint for the actuator and based on the trajectory of the actuator during one or more of the time intervals. Determining the new acceleration constraint for the actuator based on the additional constraint for the actuator and based on the trajectory of the actuator during one or more of the time intervals may include: determining the new acceleration constraint based on the new acceleration constraint being an acceleration that can be achieved during one or more of the time intervals without violation of the additional constraint. The additional constraint may be a torque constraint and/or the acceleration that can be achieved during one or more of the time intervals without violation of the additional constraint may be a maximum acceleration that can be achieved during one or more of the time intervals without violation of the additional constraint. The updated trajectories may be provided for operating the actuators of the robot prior to occurrence of any of the time intervals.

In various implementations, the method may further include: operating the actuators of the robot based on the trajectories prior to providing the updated trajectories for operating the actuators of the robot; selecting, based on the time intervals, a starting time for taking over the trajectories with the new trajectories; and determining a new current motion state based on the trajectories at the starting time. The updated trajectories transfer the new current motion state of the actuators to the target motion state of the actuators and generating the updated trajectories is based on applying, as input to the real-time trajectory generator: the new current motion state of the actuators, the target motion state, and the kinematic motion constraints of the actuators with the new acceleration constraints being included in the kinematic motion constraints in lieu of the initial acceleration constraints.

In some implementations, the additional constraint includes a torque constraint, an additional kinematic constraint, and/or a collision avoidance constraint.

In some implementations, the method further includes: operating the actuators of the robot based on the trajectories prior to providing the updated trajectories for operating the actuators of the robot; and operating the actuators of the robot based on the updated trajectories prior to completion of the operating the actuators based on the trajectory.

In some implementations, the method further includes: generating control commands based on the updated trajectories; and providing the control commands to drivers associated with the actuators for operating of the actuators of the robot based on the updated trajectories.

In some implementations, a method implemented by one or more processors may be provided that includes for each of a plurality of actuators of a robot, and after generating, by a real-time trajectory generator, a trajectory for each of the actuators based on kinematic motion constraints of the actuators: determining whether a violation of an additional constraint of the actuator occurs in at least part of the trajectory of the actuator, the additional constraint being in addition to the kinematic motion constraints used to generate the trajectories; in response to determining that at least one of the trajectories has an occurrence of the violation, determining new acceleration constraints of the kinematic motion constraints for the actuators; generating, for each of the actuators by the real-time trajectory generator, an updated trajectory by applying the new acceleration constraints to the real-time generator; and providing the updated trajectories for operating the actuators of the robot in lieu of the trajectories. The operating of the updated trajectories in lieu of the trajectories occurs prior to a full implementation of the trajectories by the actuators.

This method and other implementations of technology disclosed herein may each optionally include one or more of the following features.

In some implementations, each of the trajectories are defined by an acceleration profile having a plurality of segments and determining whether a violation of the additional constraint of the actuator occurs in at least part of the trajectory of the actuator includes: identifying an end of each of the segments of the acceleration profile; and determining whether the violation occurs at each of the ends of the segments based on a motion state of the actuator at each of the ends of the segments.

In some implementations, determining the new acceleration constraints for the actuators includes: determining a time interval of the violation in each of the trajectories with the violation and determining the new acceleration constraints based on one or more of the time intervals. In some of those implementations, determining the new acceleration constraints based on one or more of the time intervals includes: for each of the actuators, determining the new acceleration constraint for the actuator based on the additional constraint for the actuator and based on the trajectory of the actuator during one or more of the time intervals. In various implementations, the updated trajectories are provided for operating the actuators of the robot prior to occurrence of any of the time intervals.

Other implementations may include one or more non-transitory computer readable storage media storing instructions executable by one or more processors to perform a method such as one or more of the methods described above. Yet another implementation may include a robot and/or robotic control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

As used herein, a trajectory of a component defines one or more motion states (e.g., position, velocity, acceleration, and/or jerk) of the component over time. A trajectory of an end effector of a robot is dictated by the trajectories of actuators of the robot that control the movement of the end effector. Accordingly, the trajectory of the end effector is dictated by the progression over time of position, velocity, acceleration, and jerk of each of the actuators that control the movement of the end effector.

The present disclosure is generally directed to methods and apparatus for generating updated robot actuator trajectories in response to violation of torque constraints and/or other constraints in previously generated robot actuator trajectories.

In some implementations, a real-time trajectory generator is used to generate trajectories for actuators of a robot based on a current motion state of the actuators, a target motion state of the actuators, and kinematic motion constraints of the actuators. In some of those implementations, the generated trajectory of each of the actuators is analyzed to determine whether a violation of an additional constraint (e.g., a torque constraint) occurs in the trajectory. In response to determining one or more violations of the additional constraint, one or more new kinematic motion constraints (e.g., new acceleration constraints) of the actuators are determined based on the violation(s). The real-time trajectory generator may then generate updated trajectories for the actuators based on applying the new kinematic motion constraints in lieu of their counterparts used in generating the trajectories that included the violation(s) of the additional constraint. The updated trajectories may then be used in lieu of one or more time steps of the prior trajectories.

Figure 1:
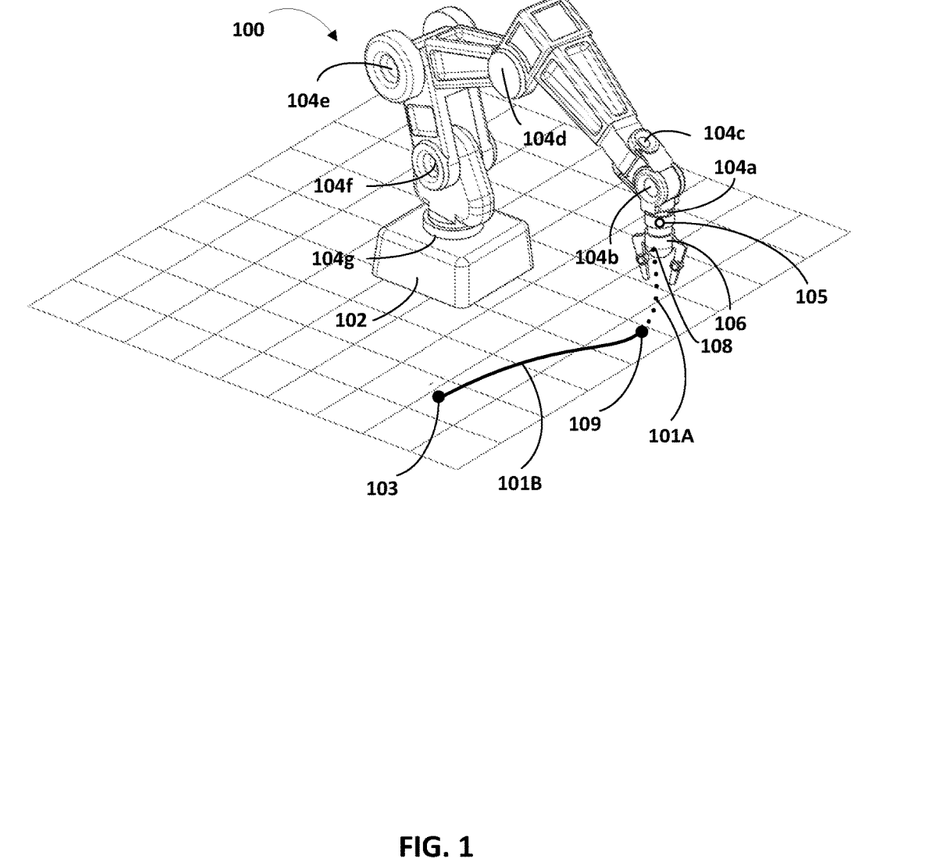
FIG. 1 illustrates an example robot and graphical representations of positions traversed by a reference point of an end effector of the robot to reach a target waypoint based on a portion of generated initial trajectories of actuators of the robot, and based on generated updated trajectories of the actuators that take over the initial trajectories in response to determining full implementation of the initial trajectories would violate one or more constraints.

With reference to FIG. 1, one example is provided of positions traversed by a reference point 108 of an end effector 106 of a robot 100 to reach a target waypoint 103 based on generated initial trajectories of actuators of the robot, and based on generated updated trajectories that take over the initial trajectories in response to determining full implementation of the initial trajectories would violate one or more constraints. In FIG. 1, dotted line segment 101A illustrates the positions traversed by the reference point 108 based on generated initial trajectories, solid line segment 101B illustrates the positions traversed by the reference point 108 based on generated updated trajectories, and point 109 illustrates the transition point where the updated trajectories take over for the initial trajectories.

As mentioned, the generated updated trajectories may be generated in response to determining that full implementation of the initial trajectories would violate a constraint (e.g., a torque constraint). For example, one or more new kinematic motion constraints (e.g., new acceleration constraints) of the actuators may be determined based on the violation(s), and the new kinematic motion constraints may be used by a real-time trajectory generator in generating the updated trajectories. For instance, the new kinematic motion constraints may be used in lieu of their counterparts that were used in generating the initial trajectories that include the violation(s) of the additional constraint. The point 109 where the updated trajectories take over for the initial trajectories may be selected so that the updated trajectories "take over" prior to implementation of any of the time steps, of the initial trajectories, that include violation(s) of the constraint. For example, the point 109 may be selected based on it being prior to an earliest in time violation of the constraint in the initial trajectories.

In some situations, the line segment 101B traversed by reference point 108 may differ from that which would have been traversed had the initial trajectories not been taken over by the updated trajectories at point 109. In some other situations, the line segment 101B traversed by reference point 108 may be the same as that which would have been traversed had the initial trajectories not been taken over by the updated trajectories at point 109. However, in those other situations the reference point 108 will traverse the line segment 101B at different velocities, accelerations, and/or jounces than it would have had the initial trajectories not been taken over by the updated trajectories at point 109.

The robot 100 of FIG. 1 is in a form often referred to as a "robot arm" and includes a base 102 and a plurality of actuators. Seven of the actuators of robot 100 are referenced in FIG. 1 with 104*a-g*. It is understood that the actual "actuators" are "under" the exterior surfaces of robot 100 indicated by references 104*a-g*. Each of the actuators 104*a-g* provides a degree of freedom of movement for the robot 100 and the motion states of the actuators 104*a-g* dictate the motion state of the end effector 106. For example, the position of the end effector 106 in FIG. 1 is dictated by the positions of the actuators 104*a-g* in FIG. 1. In some implementations, each of the actuators 104*a-g* may be a servo motor that enables controllable rotation, about a respective axis, in a first direction and/or a second direction.

The actuators 104*a-g* enable the end effector 106 to move with any one of a plurality of trajectories when moving a reference point 108 of the end effector 106 from a first position of a current motion state of the end effector 106 to a second position of a target motion state. In some implementations, the position of the end effector may be the position of a reference point of the end effector, such as reference point 108. In some implementations, the reference point of an end effector may be a center of mass of the end effector, and/or a point near where end effector attaches to other components of the robot, though this is not required.

Robot 100 may include other actuators in addition to actuators 104*a-g*, but those are not labeled in FIG. 1 for the sakes of clarity and brevity. As used herein, an "actuator" of a robot may refer to motors (e.g., servo motors), joints, shafts, gear trains, pumps (e.g., air or liquid), pistons, drives, and/or other components that may create and/or undergo propulsion, rotation, and/or motion. An actuator may optionally have an associated driver that receives control commands for driving the actuator and converts those control commands into one or more signals for driving the actuator.

As used herein, "end effector" may refer to a variety of tools that may be operated by robot 100 in order to accomplish various tasks. In FIG. 1 herein, for example, end effector 106 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

In some implementations, a path planner or other component may provide a target motion state that indicates end effector 106 should transition from its current motion state to a motion state where the reference point 108 is positioned at waypoint 103, such as a target motion state where the reference point 108 is positioned at waypoint 103 with the end effector 106 at zero velocity. In many implementations, the path planner may provide multiple sequential waypoints to be achieved, such as one or more waypoints that are between waypoint 103 and the illustrated current position of the reference point 108.

Figure 2:
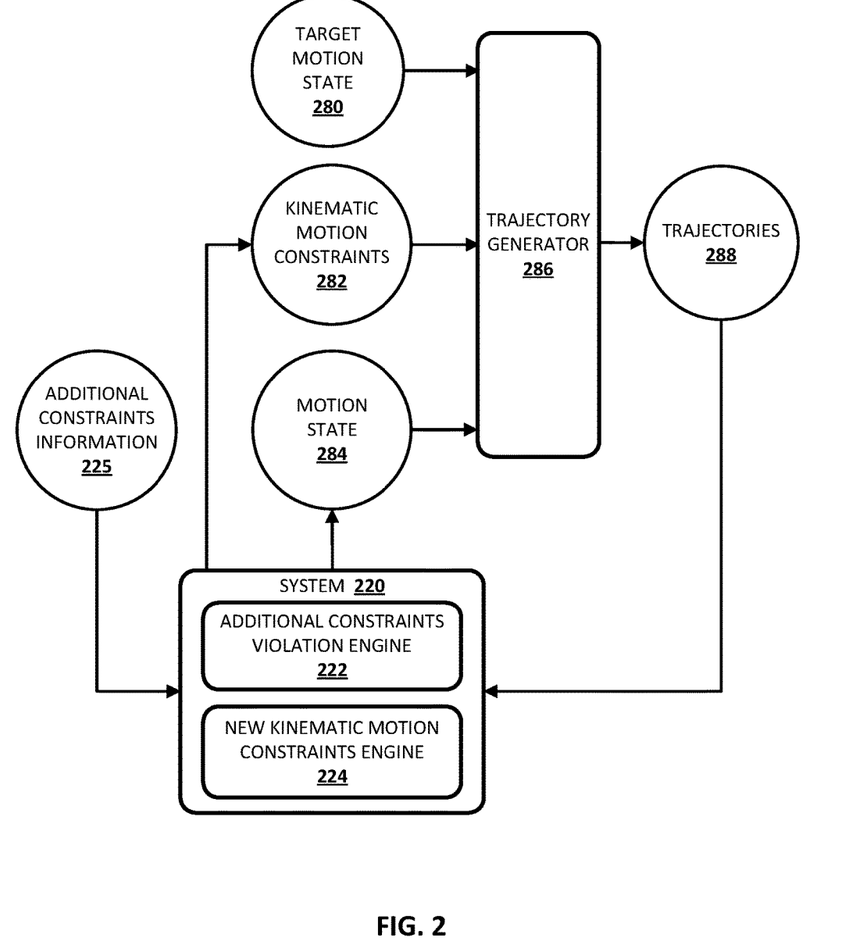
FIG. 2 illustrates an example environment in which implementations disclosed herein may be implemented.

Turning now to FIG. 2, an example environment is illustrated in which implementations disclosed herein may be implemented. The environment includes a trajectory generator 286 and a system 220 that includes additional constraints violation engine 222 and new kinematic motion constraints engine 224. The trajectory generator 286, engine 222, and/or engine 224 may be implemented by one or more processors, such as one or more processors that are local to a robot and/or that are in communication with (but separate from) the robot.

The trajectory generator 286 generates trajectories 288 in real-time based on a current motion state 284 of actuators of a robot, a target motion state 280 of the actuators, and kinematic motion constraints 282 of the actuators. In some implementations, generating trajectories in real-time means generating trajectories within a control cycle of a robot for which the trajectories are generated.

The target motion state 280 defines a desired motion state to be reached by the actuators of a robot, such as robot 100. For example, the target motion state may define particular positions of the actuators and zero velocity, zero acceleration, etc. For instance, the target motion state may be a motion state where the positions of the actuators cause an end effector to be at a particular position and maintain that position. As another example, the target motion state may define particular positions of the actuators and non-zero velocities, accelerations, and/or jerks for one or more of the actuators. For instance, the target motion state may be a motion state that causes an end effector to be at a particular position and arrive at that position with a particular velocity.

Various techniques may be utilized to determine the target motion state. For example, the target motion state may be provided by a path planner of the robot. Also, for example, the path planner may provide a target motion state of an end effector, and the target motion state for the actuators may be determined based on the target motion state of the end effector. For instance, the path planner may provide a target motion state of the end effector that is a waypoint in Cartesian space and the target motion states of the actuators in joint space determined based on applying that waypoint to a kinematic model of the robot (to determine positions of actuators that will cause a reference point of the end effector to be at that waypoint).

In some implementations, the target motion state for actuators may be based on inputted value(s), value(s) retrieved from hardware memory accessible to trajectory generator 286, and/or other values. For example, the target motion state may be determined based on a waypoint defined in response to a user providing input via one or more user interface input devices of a computing device. For instance, the computing device may generate a graphical user interface displaying an environment around a robot and the user may provide input via the graphical user interface to select a position in the environment to utilize as the waypoint. Also, for example, the target motion state may be determined based on a waypoint defined as part of a program or task being executed by the robot. For instance, the robot may be programmed to move a reference point of the robot from a current position to one or more waypoints upon occurrence of one or more events, such as upon the occurrence of certain output from one or more sensors of the robot. Also, for example, the target motion state may be determined based on a waypoint determined based on sensor data from one or more sensors of the robot. For instance, image data from a stereographic camera may be utilized to detect an object in a robot's environment and a waypoint determined to reach the object.

The motion state 284 defines a starting motion state from which the trajectory generator 286 is to generate the trajectories 288. In some situations, the motion state 284 is the current motion state of the actuators of a robot, such as robot 100. For example, when the robot is currently stationary, the current motion state may define particular positions of the actuators and zero velocity, zero acceleration, etc. Also, for example, when the robot is currently in motion, the current motion state may define particular positions of the actuators and non-zero velocities, accelerations, and/or jerks for one or more of the actuators. In some implementations, the motion state 284 is an anticipated motion state of the actuators of a robot, such as robot 100. For example, in a given iteration the trajectory generator 286 may generate updated trajectories to take over at a future time and may utilize, as the motion state 284 for the given iteration, the anticipated motion state of the actuators at that future time. For instance, actuators of a robot may be operating based on prior trajectories and the trajectory generator 286 may generate updated trajectories that are to take over the prior trajectories at a future time. The motion state 284 may be the motion state of the actuators at the future time as dictated by the prior trajectories at the future time.

The kinematic motion constraints 282 define constraints for each of the actuators. The kinematic motion constraints 282 may include, for example, minimum/maximum velocities, minimum/maximum positions, minimum/maximum accelerations, minimum/maximum jerks, and/or minimum/maximum jounces. As described herein, one or more of the kinematic motion constraints 282 may be dynamically adjusted by the system 220 in response to determining that one or more additional constraints will violated by prior trajectories (e.g., trajectories that are currently being implemented). For example, the system 220 may adjust one or more acceleration constraints for one or more actuators based on one or more determined violations of an additional constraint, and the adjusted acceleration constraint(s) may be used in generating trajectories 288 by the trajectory generator 286 in lieu of acceleration constraint(s) utilized in a prior iteration of generating trajectories 288 by the trajectory generator 286. Additional description of the system 220 is provided below.

In some implementations, the trajectory generator 286 utilizes the target motion state 280, the kinematic motion constraints 282, and the current motion state 284 to generate a trajectory for each of the actuators. The trajectory generator 286 generates the trajectories to transfer the current motion state 284 of the actuators to the target motion state 280 of the actuators in view of the currently set kinematic motion constraints 282. In some of those implementations, the trajectory generator 286 seeks to transfer the current motion state 284 to the target motion state 280 in a manner that is time-optimal in view of the currently set kinematic motion constraints 282. For example, where the current kinematic motion constraints 282 include one or more acceleration constraints that have been adjusted by the system 220, the trajectories 288 may transfer the current motion state 284 to the target motion state 280 in a manner that is time-optimal in view of those acceleration constraints and in view of any other kinematic constraints.

In some implementations, to generate a trajectory for a given actuator, the trajectory generator 286 may select, from a finite group of motion profiles, a motion profile that transfers the given actuator from its current motion state to its target motion state within the shortest time possible while conforming to the currently set kinematic motion constraints 282 for that actuator. In some implementations, the trajectory generator 286 selects a motion profile based on decision trees. Each of the motion profiles of the finite group may include a velocity profile, an acceleration profile, and/or a jerk profile. Accordingly, the trajectory generated based on a selected motion profile may define motion states (e.g., positions, velocities, accelerations, jerks over time) for the given actuator.

Figure 3A:
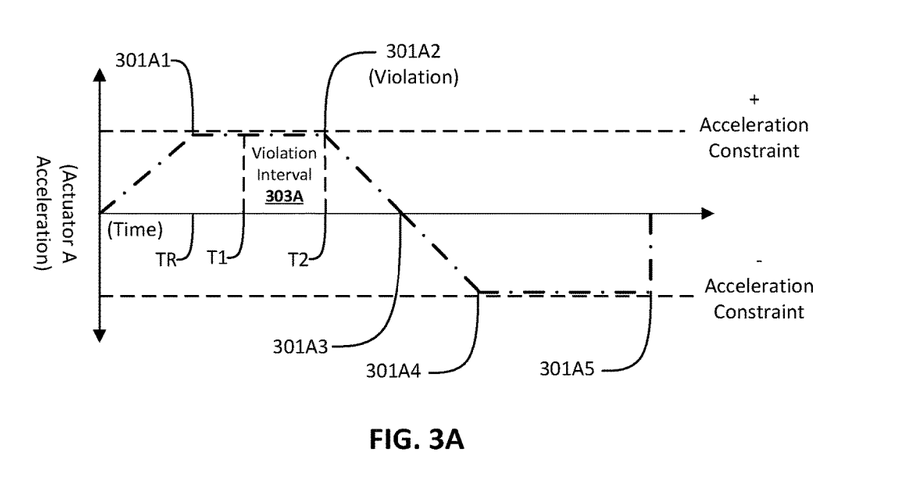
FIGS. 3A and 3B depict example acceleration profiles of actuators that may be generated as trajectories for actuators and illustrates violations and violation intervals that may be determined according to some implementations disclosed herein.
Figure 3B:
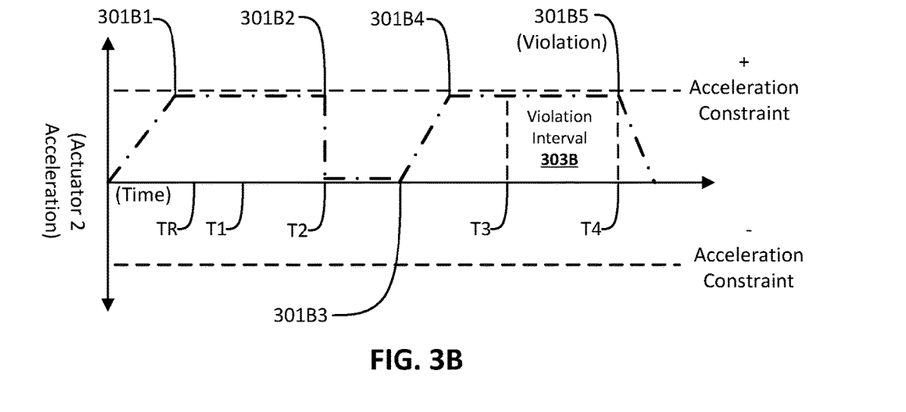

FIGS. 3A and 3B depict example acceleration profiles of actuators that may be generated as all or part of trajectories in a given iteration of trajectory generator 286. Each of the acceleration profiles is illustrated as a dot-dashed line along a horizontal axis that represents time and a vertical axis that represents a direction and magnitude of acceleration. FIG. 3A illustrates the acceleration profile for a first actuator (Actuator A) and FIG. 3B illustrates the acceleration profile for a second actuator (Actuator B). FIGS. 3A and 3B each also illustrate, as dashed horizontal lines, acceleration constraints included in the kinematic motion constraints 282 used to generate the acceleration profiles in the given iteration of trajectory generator 286 that resulted in the acceleration profiles of FIGS. 3A and 3B. The acceleration constraints for each actuator include a positive/maximum constraint (acceleration in a first direction) and a negative/minimum constraint (for acceleration in a second direction). From viewing FIGS. 3A and 3B, it is appreciated that the acceleration constraints constrain the acceleration profiles of those figures. For example, the acceleration profiles of FIGS. 3A and 3B may approach or reach the acceleration constraints, but do not extend beyond the acceleration constraints. Although symmetric acceleration constraints are illustrated in FIGS. 3A and 3B, asymmetric acceleration constraints may be utilized in one or more iterations of generating trajectories by trajectory generator 286.

The trajectory generator 286 may iteratively generate new trajectories 288 at each control cycle, in response to identifying a new target motion state 280, and/or in response to other signals. In some situations, the trajectory generator 286 generates new trajectories 288 to replace previously generated trajectories prior to full (or any) implementation of the prior trajectories. In some of those implementations, the trajectory generator 286 generates the new trajectories based on one or more updated kinematic motion constraints provided by the system 220 and for a motion state 284 that is based on output from the system 220. For example, the additional constraints violation engine 222 of the system 220 may determine, based on analysis of a previously generated trajectories 288, that one or more constraints are violated. The new kinematic motion constraints engine 224 may then determine, based on the violation(s) determined by engine 222, one or more new kinematic motion constraints and a time step at which new trajectories generated based on the new kinematic motion constraints should replace the previously generated trajectories. The trajectory generator 286 may utilize the generated new kinematic motion constraints and a motion state at the time step, to generate updated trajectories that take over the prior trajectories at the time step.

As one example, and with additional reference to FIGS. 3A and 3B, assume that at a given iteration trajectory generator 286 generates a trajectory for each of a plurality of actuators, including the trajectory for "Actuator A" indicated by the acceleration profile of FIG. 3A and the trajectory for "Actuator B" indicated by the acceleration profile of FIG. 3B.

The additional constraints violation engine 222 may analyze the acceleration profile illustrated by FIG. 3A to determine if an additional constraint is violated by the trajectory of Actuator A. In some implementations, the engine 222 analyzes each of the endpoints 301A1-301A5 to determine whether a violation of an additional constraint for Actuator A occurs. Each of the endpoints 301A1-301A5 is an endpoint of a polynomial segment of the polynomial segments that define the acceleration profile. As indicated in FIG. 3A, the engine 222 has determined that a violation of the additional constraint occurs at the end point 301A2, but that no violations occur at the other endpoints 301A1 and 301A3-301A5.

Various additional constraints may be considered by the additional constraints violation engine 222. In various implementations, the constraints are considered "additional" in that they are in addition to the kinematic motion constraints 282 and/or any other constraints utilized by the trajectory generator 286 in generating the trajectories 288.

As one example, the engine 222 may determine if one or more torque constraints of Actuator A is violated by the trajectory of Actuator A. The torque constraint(s) considered may include a maximum torque constraint (i.e. a "positive" torque constraint) and/or a minimum torque constraint (i.e., a "negative" torque constraint). The torque constraint(s) of Actuator A may be preset and may depend on mechanical properties of Actuator A and/or preferences of a user or device that sets the torque constraint. The torque constraint(s) of Actuator A may be the same across all configurations of the robot, or may vary based on the configuration. In some implementations, to determine whether a torque constraint is violated at a given endpoint, the engine 222 calculate the torque at the given endpoint and compares the calculated torque to one or more torque constraints. In some of those implementations, calculating the torque at the given endpoint may be based on a dynamic model of the robot, the motion state of Actuator A as indicated by the acceleration profile at the given endpoint, and the motion states of other actuators (e.g., Actuator B) at corresponding times as indicated by their motion profiles. In other implementations, the torque may be identified based on a mapping of motion states of actuators to torque values.

Other examples of additional constraints that may be considered by engine 122 include, for example, collision avoidance constraints, kinematic motion constraints that are in addition to the kinematic motion constraints 282 considered by the trajectory generator 286, other dynamic constraints that are in addition to torque constraints, and/or user imposed constraints. A collision avoidance constraint is violated by a portion of an actuator's trajectory if a configuration of the robot at that portion of the trajectory (and the trajectories of the other actuators for the corresponding time) would cause a collision between the robot and an object in the environment of the robot and/or would cause the robot and an object in the environment to be less than a threshold distance apart. A collision checker and/or other techniques may optionally be utilized to determine whether a collision constraint is violated.

In various implementations, the additional constraints engine may determine the additional constraints based on provided additional constraints information 225. For example, the additional constraints information 225 may be stored in memory and may define the torque constraints for each of the actuators for each of a plurality of different configurations of the actuators. Also, for example, the additional constraints information 225 may be provided by a collision checker and may define whether there is a collision and/or close proximity between the robot and an object based on a portion of a trajectory.

Regardless of the additional constraint(s) considered, if the engine 222 determines an occurrence of a violation of an additional constraint, the engine 222 may then determine a time interval of the violation using bisection and/or other technique(s). For example, for the violation at end point 301A2 of FIG. 3A, the engine 222 may use bisection to determine the violation interval 303A illustrated in FIG. 3A. The violation interval 303A extends from a time step T1 to a time step T2. In scenarios where multiple violations occur (in one trajectory of an actuator or across trajectories of multiple actuators), the violation interval may be a union of individual intervals determined for each of the violations.

The engine 222 may similarly analyze the acceleration profile illustrated by FIG. 3B and determine that a violation of the additional constraint occurs at the end point 301B5, but that no violations occur at the other endpoints 301B1-301B4. Further, for the violation at end point 301B5, the engine 222 may use bisection to determine the violation interval 303B illustrated in FIG. 3B. The violation interval 303B extends from a time step T3 to a time step T4.

The new kinematic motion constraints engine 224 uses the violations determined by additional constraints violation engine 222 to determine one or more new kinematic motion constraints, such as acceleration constraints. For example, the engine 224 may determine the earliest in time violation interval(s) and determine a new acceleration constraint for each of the actuators based on a maximum acceleration constraint that could be used in those violation interval(s) without violation of the additional constraint(s) considered by the additional constraints violation engine 222.

As one example, in FIGS. 3A and 3B the violation interval 303A may be determined to be the earliest in time violation interval. To determine the new acceleration constraint for Actuator A, the engine 224 may determine the maximum acceleration for Actuator A that could be used in the violation interval 303A without violation of the torque constraint for Actuator A. This maximum acceleration, or a reduction of it (e.g., a 5% reduction), may then be utilized as the new acceleration constraint for Actuator A. In some of those implementations, determining the maximum acceleration that could occur without violation of the torque constraint may be based on a dynamic model of the robot and configurations of Actuator A and other actuators during the violation interval 303A. Additional and/or alternative techniques may be utilized. It is noted that the new acceleration constraint for Actuator A will be reduced relative to the maximum/positive acceleration constraint illustrated in FIG. 3A since the violation interval 303A is based on a violation that occurs in the acceleration profile of Actuator A.

To determine the new acceleration constraint for Actuator B, the engine 224 may determine the maximum acceleration for Actuator B that could be used in the violation interval 303A without violation of the torque constraint for Actuator B. In other words, for Actuator B the engine 224 will likewise consider the time interval between time steps T1 and T2, but will do so in view of the acceleration profile of FIG. 3B and in view of the torque constraint for Actuator B. This maximum acceleration, or a reduction of it (e.g., a 5% reduction), may then be utilized as the new acceleration constraint for Actuator B. The new acceleration constraint for Actuator B may be the same as the maximum/positive acceleration constraint illustrated in FIG. 3B or different, depending on the violation interval and/or the configurations of Actuator B and other actuators during the violation interval.

In some situations, two or more violation intervals may overlap. For example, a determined violation interval of a first actuator may abut or overlap with that of a second actuator. Also, for example, a determined violation interval of a first actuator may abut or overlap with another violation interval of the first actuator. In some of those situations where one of the violation intervals is the earliest in time violation interval, the violation interval considered by the engine 224 in determining the new acceleration constraints may be a union of the abutting or overlapping violation intervals. For instance, assume another violation interval overlapped with violation interval 303A and extends from a time step that was between time steps T1 and T2 to another time step that was after time step T2. A union of that other violation interval and violation interval 303A may be determined and the union utilized to determine the new acceleration constraint for Actuator A, Actuator B, and any other actuators.

Although only violation and adjustment of the positive/maximum acceleration constraints is described with respect to FIGS. 3A and 3B, it is understood that the negative/minimum acceleration constraints for one or more actuators may additionally or alternatively be violated and/or that new acceleration constraints determined for the negative/minimum acceleration constraints. For example, one or more of the negative/minimum acceleration constraints of the actuators: may optionally be adjusted to the same degree that their corresponding positive/maximum acceleration constraints are adjusted, may only be adjusted if a violation of those constraints is determined to occur in one or more trajectories, and/or may be adjusted based on a determined earliest in time violation interval corresponding to a negative acceleration motion profile segment in one or more of the actuators.

The new kinematic motion constraints engine 224 may then provide the new kinematic motion constraints (e.g., new acceleration constraints) to the trajectory generator 286 in lieu of their counterparts used as kinematic motion constraints 282 in generating the prior trajectories. It is understood that the new kinematic motion constraints will include at least one kinematic motion constraint for at least one actuator that is different than the kinematic motion constraints 282 utilized in generating the prior trajectories. However, all of the new kinematic motion constraints are not necessarily different than the kinematic motion constraints 282 utilized in generating the prior trajectories. For example, where new acceleration constraints are provided for use in lieu of acceleration constraints utilized in generating the prior trajectories, one or more of those acceleration constraints may be different from the prior constraints, but one or more may be the same as the prior constraints.

The real-time trajectory generator 286 may then generate updated trajectories 288 for the actuators based on applying the new kinematic motion constraints in lieu of their counterparts used in generating the prior trajectories 288 that had the violation(s) of the additional constraint. In generating the updated trajectories 288, the real-time trajectory generator may further use one or more additional kinematic constraints (e.g., position, jerk), the target motion state of the actuators, and a new motion state 284 of the actuators. Where the prior trajectories have been partially implemented by the actuators, the new motion state 284 may be a motion state of the actuators as defined by the prior trajectories at a starting time that is prior to the earliest violation interval. The updated trajectories may then take over the prior trajectories at that starting time. The starting time that is prior to the interval of the violation may be selected, for example, as a time that is at the beginning of a motion profile segment for an actuator with an occurrence of a violation, where the motion profile segment is included in the violation interval of the earliest violation interval. For example, in FIGS. 3A and 3B the starting time may be selected as time step TR, which corresponds to endpoint 301A1 that is the endpoint that defines the endpoint of a motion profile segment that precedes the motion profile segment that includes the violation interval 303A, and that defines the beginning of the motion profile segment that includes the violation interval 303A.

The updated trajectory of each of the actuators may then be analyzed to determine whether a violation of the additional constraint occurs, one or more further new kinematic motion constraints determined if violation(s) occur, and further updated trajectories optionally generated based on the further new kinematic motion constraints (if the violation(s) occurred). Additional iterations of this general technique may occur until, for example, feasible trajectories over multiple time steps are achieved, the target waypoint is reached, and/or other criteria is satisfied.

Figure 4:
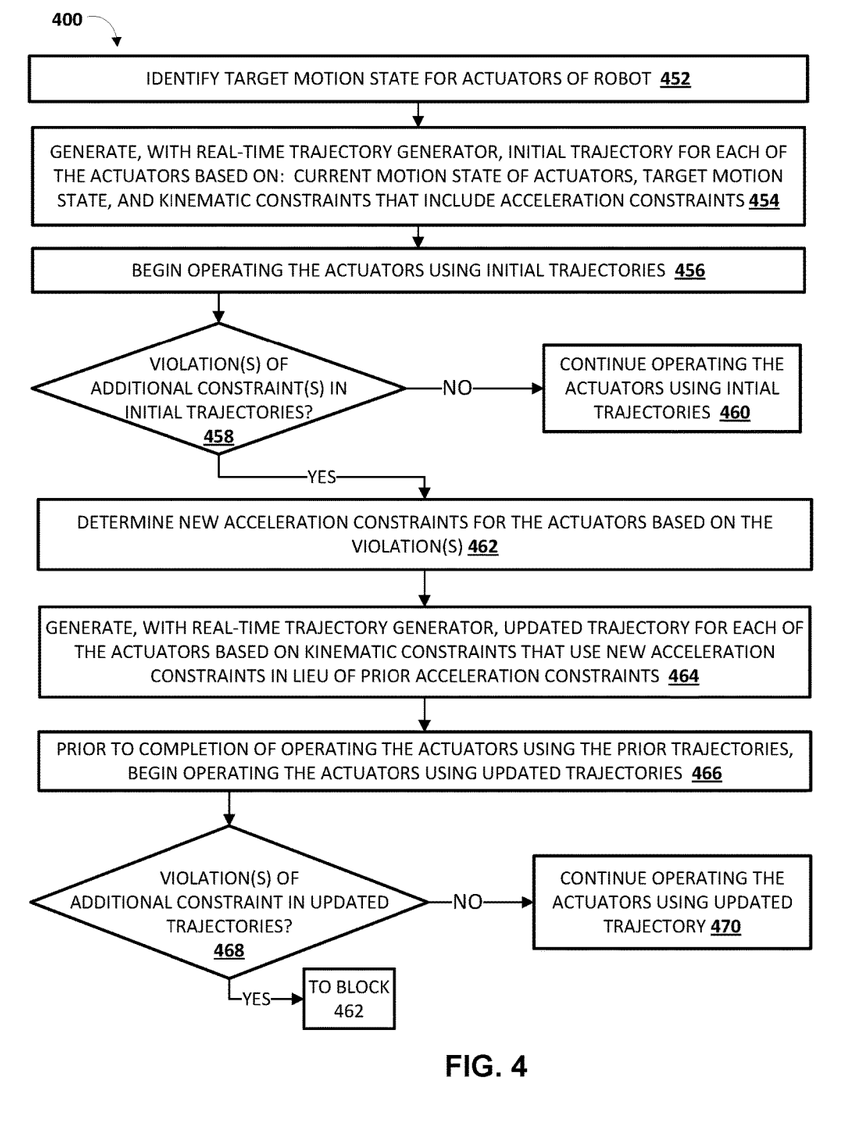
FIG. 4 is a flow chart illustrating an example method of some implementations disclosed herein.

Turning now to FIG. 4, additional description is provided of various implementations of generating updated robot actuator trajectories in response to violation of torque constraints and/or other constraints in previously generated robot actuator trajectories. FIG. 4 depicts a flow chart illustrating an example method 400 of some implementations disclosed herein. For convenience, the operations of the flow chart are described with reference to a system that performs the operations. This system may include trajectory generator 286, which may be implemented by one or more components of a robot, such as a processor and/or robot control system of robot 100, robot 500 and/or other robot; and/or may be implemented by one or more computing device(s) that are separate from a robot, such as computing device 610. Moreover, while operations of method 400 are shown in a particular order, this is not meant to be limiting. One or more operations may be reordered, omitted or added.

At block 452, the system identifies a target motion state for actuators of a robot. The target motion state may define, for example, particular positions of the actuators and zero velocity, zero acceleration, etc.—or may define particular positions and non-zero velocities, accelerations, etc. for one or more of the actuators.

At block 454, the system generates, with a real-time trajectory generator, an initial trajectory for each of the actuators. In other words, the system generates trajectories for each actuator independently. In some implementations, the system generates the initial trajectories based on: the target motion state of block 452, a current motion state of actuators of the robot, and kinematic motion constraints of the actuators. For example, to generate the trajectory for a given actuator, the system may select, from a finite group of motion profiles, a motion profile that transfers the given actuator from its current motion state to its target motion state within the shortest time possible given the kinematic motion constraints. In some implementations, the system selects a motion profile based on decision trees. Each of the motion profiles of the finite group may include a velocity profile, an acceleration profile, and/or a jerk profile. Accordingly, the trajectory generated based on a selected motion profile may define motion states (e.g., positions, velocities, accelerations, jerks over time) for the given actuator.

At block 456, the system begins operating the actuators using the initial trajectories generated at block 454. For example, the system may provide control commands to drivers associated with the actuators to cause the actuators to operate according to the initial trajectories.

At block 458, the system determines whether there is a violation of one or more additional constraints in the initial trajectories generated at block 456. For example, the system may determine, for each of the actuators, whether one or more violations of an additional constraint for the actuators occur in the initial trajectory for the actuator. For instance, the system may determine whether a torque constraint for a first actuator is violated by the initial trajectory for the first actuator, may determine whether a torque constraint for a second actuator (which may be different than the torque constraint for the first actuator) is violated by the initial trajectory for the second actuator, etc. In various implementations, the additional constraints are considered "additional" in that they are in addition to the kinematic motion constraints and/or any other constraints utilized by the real-time trajectory generator in block 454. In some implementations where the initial trajectories of block 454 include motion profiles, the system analyzes each of the endpoints of polynomial segments of the motion profiles in determining whether a violation of an additional constraint occurs for the corresponding actuator.

If the system determines at block 456 that there are no violations of additional constraints in the initial trajectories, the system proceeds to block 458 and continues operating the actuators using the initial trajectories. In some of those implementations, the system may continue to operate the actuators using the initial trajectories until the occurrence of one or more events, such as reaching the target motion state of block 452, receiving a new target motion state, receipt of a sensor signal that causes the initial trajectories to be aborted, etc.

Block 458 may occur prior to or simultaneous with block 456 in some implementations. For example, block 458 may begin in the same control cycle as block 456 in some implementations. Also, for example, in some implementations block 458 may occur prior to block 456 and in some of those implementations block 456 may only be implemented if it is determined at block 458 that there are no violations of additional constraints in the initial trajectories.

If the system determines at block 456 that there are violations of additional constraints in the initial trajectories, the system proceeds to block 462.

At block 462, the system determines new acceleration constraints for the actuators based on the violation(s) determined at block 458. For example, the system may determine violation intervals based on the violations of block 456 and determine the earliest in time violation interval(s) of those determined violation intervals. The system may then determine a new acceleration constraint for each of the actuators based on a maximum acceleration constraint that could be used in those earliest in time violation interval(s) without violation of the additional constraint(s) considered at block 458.

As one example, the system may determine a particular violation interval to be the earliest in time violation interval. To determine the new acceleration constraint for a first actuator, the system may determine the maximum acceleration for that actuator that could be used in the particular violation interval without violation of the additional constraint. This maximum acceleration, or a reduction of it, may then be utilized as the new acceleration constraint for the first actuator. To determine the new acceleration constraint for a second actuator, the system may determine the maximum acceleration for that actuator that could be used in the particular violation interval without violation of the additional constraint. This maximum acceleration, or a reduction of it, may then be utilized as the new acceleration constraint for the second actuator. It is noted that the new acceleration constraint for one or more of the actuators will be reduced relative to its counterpart used in block 454, while the new acceleration constraint of other actuators may optionally be the same as its counterpart used in block 454.

At block 464, the system generates, with the real-time trajectory generator, an updated trajectory for each of the actuators based on kinematic constraints that use the new acceleration constraints in lieu of corresponding prior acceleration constraints. In other words, the system generates trajectories for each actuator independently. In some implementations, the system generates the updated trajectories further based on a motion state of the actuators that is determined based on the actuators operating according to the initial trajectories, but that is a motion state of the actuators that occurs prior to occurrence of any of the violations determined at block 456. The system may generate the updated trajectories further based on the target motion state of block 452. In some implementations, to generate the trajectory for a given actuator, the system may select, from a finite group of motion profiles, a motion profile that transfers the given actuator from its considered motion state to its target motion state within the shortest time possible given the considered kinematic motion constraints (that include the new acceleration constraint(s) for the actuator).

At block 466, prior to completion of operating the actuators using the prior trajectories, the system operates the actuators using the updated trajectories. For example, the system may provide control commands to drivers associated with the actuators to cause the actuators to operate according to the updated trajectories. As described herein, the time step at which the system transitions from operating the actuators using the prior trajectories to operating the actuators using the updated trajectories may correspond to the motion state utilized in block 464 and may be selected based on various considerations. For example, the time step may be selected based on occurring prior to the occurrence of any of the violations determined at block 458.

At block 468, the system determines whether there is a violation of one or more additional constraints in the updated trajectories generated at block 466. For example, the system may determine, for each of the actuators, whether one or more violations of an additional constraint for the actuators occurs in the updated trajectory for the actuator. For instance, the system may determine whether a torque constraint for a first actuator is violated by the updated trajectory for the first actuator, may determine whether a torque constraint for a second actuator (which may be different than the torque constraint for the first actuator) is violated by the updated trajectory for the second actuator, etc. Block 468 may share one or more aspects in common with block 458 in various implementations.

If the system determines at block 468 that there are no violations of additional constraints in the updated trajectories, the system proceeds to block 470 and continues operating the actuators using the updated trajectories. In some of those implementations, the system may continue to operate the actuators using the updated trajectories until the occurrence of one or more events, such as reaching the target motion state of block 452, receiving a new target motion state, receipt of a sensor signal that causes the updated trajectories to be aborted, etc.

Block 468 may occur prior to or simultaneous with block 466 in some implementations. For example, block 468 may begin in the same control cycle as block 466 in some implementations. Also, for example, in some implementations block 468 may occur prior to block 466 and in some of those implementations block 466 may only be implemented if it is determined at block 468 that there are no violations of additional constraints in the initial trajectories.

If the system determines at block 468 that there are violations of additional constraints in the updated trajectories, the system proceeds to block 460 and generates new acceleration constraints based on the violation(s), then proceeds to block 462 and generates a further updated trajectory for each of the actuators based on the new acceleration constraints. Multiple iterations of blocks 460, 462, 464, and 466 may occur.

Figure 5:
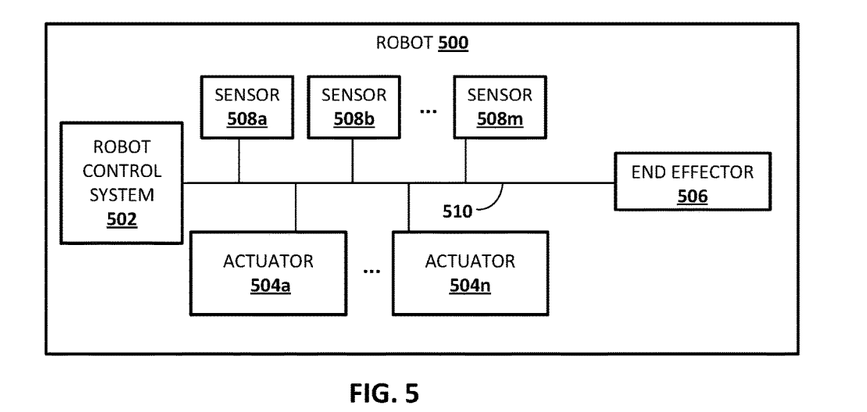
FIG. 5 schematically depicts an example architecture of a robot.

FIG. 5 schematically illustrates an example architecture of a robot 500. Robot 500 may take various forms, including but not limited to a robot arm similar to robot 100 described above, a humanoid form, an animal form, a wheeled device, a submersible vehicle, an unmanned aerial vehicle ("UAV"), and so forth.

Robot 500 includes a robot control system 502, actuators 504a-n, sensors 508a-m, and end effector 506. In various implementations, robot control system 502 may be operably coupled with one or more actuators 504a-n and/or one or more sensors 508a-m, e.g., via one or more buses 510. Sensors 508a-m may take various forms, including but not limited to position sensors, torque sensors, force sensors, light sensors, pressure sensors, pressure wave sensors (e.g., microphones), proximity sensors, accelerometers, gyroscopes, thermometers, barometers, and so forth. While sensors 508a-m are depicted as being integral with robot 500, this is not meant to be limiting. In some implementations, one or more sensors 508a-m may be located external to robot 500, e.g., as standalone units.

The robot control system 502 may be implemented in one or more processors, such as a CPU, GPU, and/or other controller(s) of the robot 500. In some implementations, the robot 500 may comprise a "brain box" that may include all or aspects of the control system 502. For example, the brain box may provide real time bursts of data to the actuators 504a-n, with each of the real time bursts comprising a set of one or more control commands that dictate, inter alia, the trajectory for each of one or more of the actuators 504a-n. In some implementations, the robot control system 502 may perform one or more aspects of method 400 described herein.

The control commands provided by robot control system 502 to actuators 504a-n include commands that direct the actuators 504a-n to move to traverse one or more trajectories generated according to techniques described herein. Moreover, the robot control system 502 may optionally determine current motion states of one or more actuators 504a-n and/or end effector 506 based on sensor feedback from one or more of the sensors 508a-m to generate trajectories in view of the motion states according to techniques described herein.

Although control system 502 is illustrated in FIG. 5 as an integral part of the robot 500, in some implementations, all or aspects of the control system 502 may be implemented in a component that is separate from, but in communication with, robot 500. For example, all or aspects of control system 502 may be implemented on one or more computing devices that are in wired and/or wireless communication with the robot 500, such as computing device 610.

Figure 6:
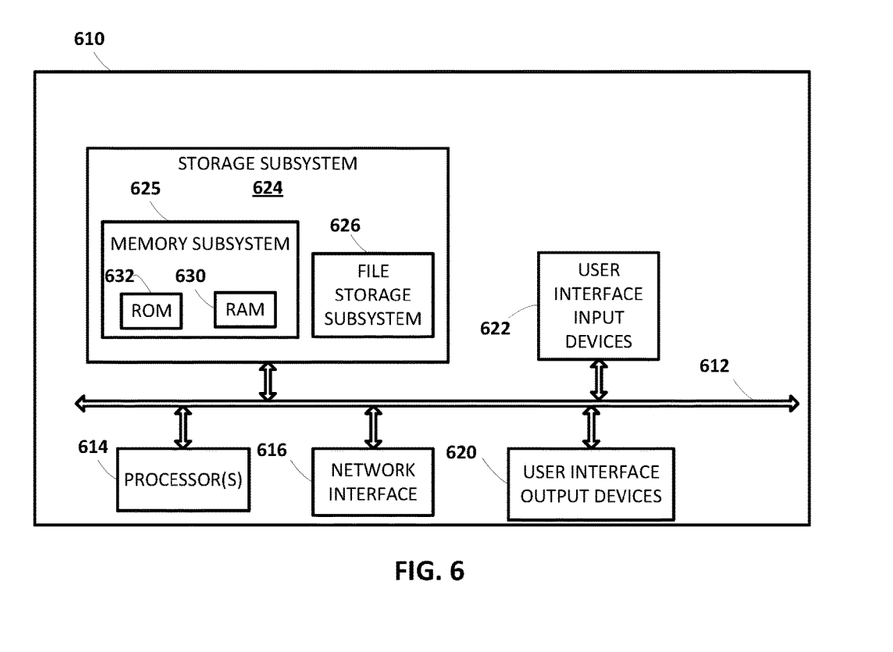
FIG. 6 schematically depicts an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   identifying a target motion state of a plurality of actuators of a robot;
   generating, for each of the actuators by a real-time trajectory generator, a trajectory that defines motion states for the actuator,
      wherein the trajectories transfer a current motion state of the actuators to the target motion state of the actuators,
      wherein generating the trajectories is based on applying, as input to the real-time trajectory generator: the current motion state of the actuators, the target motion state, and kinematic motion constraints of the actuators, and
      wherein the kinematic motion constraints include initial acceleration constraints of the actuators;
   for each of the actuators after generating the trajectories:
      determining whether a violation of an additional constraint of the actuator occurs in at least part of the trajectory of the actuator, the additional constraint being in addition to the kinematic motion constraints included in the input used to generate the trajectories;
   in response to determining that at least one of the trajectories has an occurrence of the violation, determining new acceleration constraints for the actuators;
   generating, for each of the actuators by the real-time trajectory generator, an updated trajectory, wherein generating the updated trajectory includes applying the new acceleration constraints to the real-time generator in lieu of the initial acceleration constraints; and
   providing the updated trajectories for operating the actuators of the robot in lieu of the trajectories, the operating of the updated trajectories in lieu of the trajectories occurring prior to a full implementation of the trajectories by the actuators.

2. The method of claim 1, wherein each of the trajectories are defined by an acceleration profile having a plurality of segments and wherein determining whether a violation of the additional constraint of the actuator occurs in at least part of the trajectory of the actuator comprises:
   identifying an end of each of the segments of the acceleration profile; and
   determining whether the violation occurs at each of the ends of the segments based on a motion state of the actuator at each of the ends of the segments.

3. The method of claim 1, wherein determining the new acceleration constraints for the actuators comprises:
   determining a time interval of the violation in each of the trajectories with the violation;
   determining the new acceleration constraints based on one or more of the time intervals.

4. The method of claim 3, wherein determining the new acceleration constraints based on one or more of the time intervals comprises:
   for each of the actuators, determining the new acceleration constraint for the actuator based on the additional constraint for the actuator and based on the trajectory of the actuator during one or more of the time intervals.

5. The method of claim 4, wherein determining the new acceleration constraint for the actuator based on the additional constraint for the actuator and based on the trajectory of the actuator during one or more of the time intervals comprises:
   determining the new acceleration constraint based on the new acceleration constraint being an acceleration that can be achieved during one or more of the time intervals without violation of the additional constraint.

6. The method of claim 5, wherein the acceleration that can be achieved during one or more of the time intervals without violation of the additional constraint is a maximum acceleration that can be achieved during one or more of the time intervals without violation of the additional constraint.

7. The method of claim 5, wherein the additional constraint is a torque constraint.

8. The method of claim 3, wherein the updated trajectories are provided for operating the actuators of the robot prior to occurrence of any of the time intervals.

9. The method of claim 3, further comprising:
   operating the actuators of the robot based on the trajectories prior to providing the updated trajectories for operating the actuators of the robot;
   selecting, based on the time intervals, a starting time for taking over the trajectories with the new trajectories;
   determining a new current motion state based on the trajectories at the starting time;
   wherein the updated trajectories transfer the new current motion state of the actuators to the target motion state of the actuators; and
   wherein generating the updated trajectories is based on applying, as input to the real-time trajectory generator: the new current motion state of the actuators, the target motion state, and the kinematic motion constraints of the actuators with the new acceleration constraints being included in the kinematic motion constraints in lieu of the initial acceleration constraints.

10. The method of claim 1, wherein the additional constraint is a torque constraint.

11. The method of claim 1, wherein the additional constraint is an additional kinematic constraint or a collision avoidance constraint.

12. The method of claim 1, further comprising:
operating the actuators of the robot based on the trajectories prior to providing the updated trajectories for operating the actuators of the robot; and
operating the actuators of the robot based on the updated trajectories prior to completion of the operating the actuators based on the trajectories.

13. The method of claim 1, further comprising:
generating control commands based on the updated trajectories;
providing the control commands to drivers associated with the actuators for operating of the actuators of the robot based on the updated trajectories.

14. A method implemented by one or more processors of a robot, comprising:
for each of a plurality of actuators of a robot, and after generating, by a real-time trajectory generator, a trajectory for each of the actuators based on kinematic motion constraints of the actuators:
determining whether a violation of an additional constraint of the actuator occurs in at least part of the trajectory of the actuator, the additional constraint being in addition to the kinematic motion constraints used to generate the trajectories;
in response to determining that at least one of the trajectories has an occurrence of the violation, determining new acceleration constraints of the kinematic motion constraints for the actuators;
generating, for each of the actuators by the real-time trajectory generator, an updated trajectory, wherein generating the updated trajectory includes applying the new acceleration constraints to the real-time trajectory generator; and
providing the updated trajectories for operating the actuators of the robot in lieu of the trajectories, the operating of the updated trajectories in lieu of the trajectories occurring prior to a full implementation of the trajectories by the actuators.

15. The method of claim 14, wherein each of the trajectories are defined by an acceleration profile having a plurality of segments and wherein determining whether a violation of the additional constraint of the actuator occurs in at least part of the trajectory of the actuator comprises:
identifying an end of each of the segments of the acceleration profile; and
determining whether the violation occurs at each of the ends of the segments based on a motion state of the actuator at each of the ends of the segments.

16. The method of claim 14, wherein determining the new acceleration constraints for the actuators comprises:
determining a time interval of the violation in each of the trajectories with the violation;
determining the new acceleration constraints based on one or more of the time intervals.

17. The method of claim 16, wherein determining the new acceleration constraints based on one or more of the time intervals comprises:
for each of the actuators, determining the new acceleration constraint for the actuator based on the additional constraint for the actuator and based on the trajectory of the actuator during one or more of the time intervals.

18. The method of claim 16, wherein the updated trajectories are provided for operating the actuators of the robot prior to occurrence of any of the time intervals.

19. A robot comprising:
a plurality of actuators;
one or more processors configured to:
begin operation of each of the actuators based on trajectories of the actuators, the trajectories generated by a real-time trajectory generator based on kinematic motion constraints that include initial acceleration constraints;
prior to full implementation of the trajectories by the actuators:
determine whether a violation of an additional constraint occurs in at least one of the trajectories of the actuators, the additional constraint being in addition to the kinematic motion constraints used to generate the trajectories;
in response to determining that at least one of the trajectories has an occurrence of the violation, determine new acceleration constraints for the actuators;
generate, for each of the actuators by the real-time trajectory generator, an updated trajectory, wherein generating the updated trajectory includes applying the new acceleration constraints to the real-time trajectory generator; and
provide the updated trajectories for operating the actuators of the robot in lieu of the trajectories prior to occurrence of the violation.

* * * * *